United States Patent Office 3,416,428
Patented Dec. 17, 1968

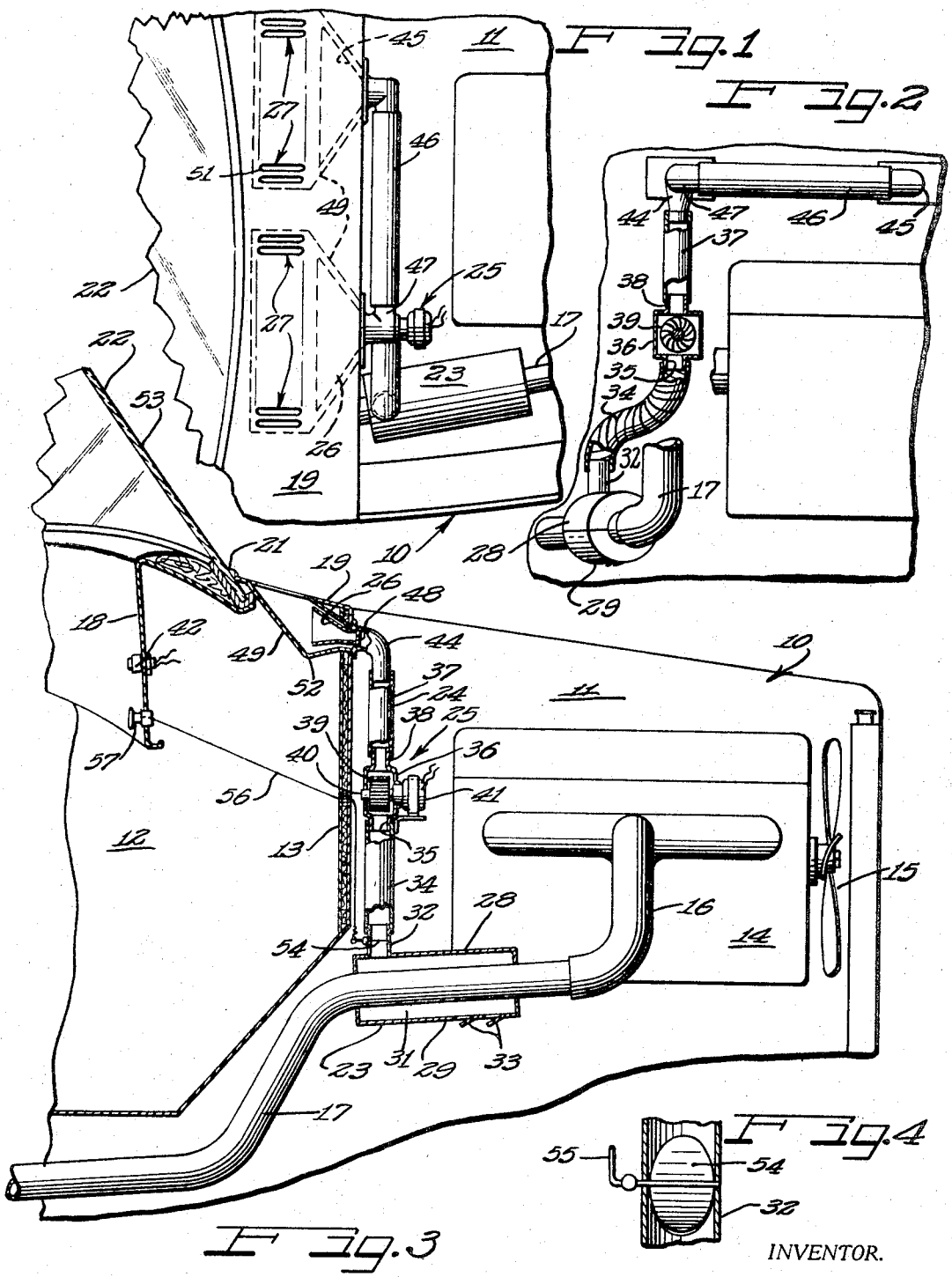

3,416,428
DEFROSTER AND WINDSHIELD HEATER
Walter K. Heller, 502 Edward St.,
Sycamore, Ill. 60178
Filed July 10, 1967, Ser. No. 652,094
4 Claims. (Cl. 98—2)

ABSTRACT OF THE DISCLOSURE

A heater for windshields of a motor vehicle having a jacket surrounding an exhaust pipe to form a chamber, a blower to draw air through the chamber to be heated and to direct the heated air through nozzles onto an exterior surface of the windshield to defrost and heat the windshield. The entire heating system is mounted on the engine side of the fire wall of the vehicle so that the occupants of the vehicle will not be subjected to any exhaust fumes if they should enter the system.

BACKGROUND OF THE INVENTION

*Field of the invention*

This invention pertains to an exhaust heater for defrosting and heating a windshield.

*Prior art*

Heaters which rely on the exhaust manifold or exhaust pipe for heating air which is then conducted to various parts of the motor vehicle are well known in the prior art as exemplified by the patent to Redkey, U.S. Patent No. 1,217,064.

The United States Patent to Evans, No. 1,917,023 is an example of the prior art manifold header for a windshield. The heater of Evans consists of a jacket having an open end directed toward the fan of the engine and being mounted on the exhaust maifold, and a conduit leading from the jacket to a nozzle which is in contact with the windshield. Evans relies upon the air stream created by the fan of the engine to force the air through the heater.

SUMMARY OF THE INVENTION

One of the primary difficulties with existing defrosters for automobiles is the warm-up time required before obtaining hot air for heating the windshild to remove frost. Heaters employed in the majority of the cars being sold today heat the air by means of the hot water from the engine cooling system. These hot water heating systems require an extensive warm-up period of the engine of the vehicle before the system will deliver warm air for heating or defrosting.

Exhaust gas heating systems have a faster warm-up time which may vary between one-half minutes to one minute after the engine has been started. Thus, an exhaust heater can deliver hot air to defroster and heat the windshield in a short time period after the engine has been started. The heater disclosed by Evans has this advantage; however, since the amount of air flowing through the heater is directly proportional to the speed of the engine and its fan, the operator of the motor vehicle has no control over the amount of warm air which will be delivered to the windshield except by changing the speed of the engine. When the engine is first started, it is undesirable to race the engine, since it has not been fully warmed-up and lubricated, and therefore it is impossible, with the Evans type heater, to get a high volume of warm air flowing on the windshield to rapidly defrost and heat the surface of the glass.

Another disadvantage with the disclosed heating system of the Evans patent is that the nozzle, or discharge means for spreading the warm air on the windshield protrudes from the cowling and will obstruct the vision of the driver. Furthermore, the protruding nozzle lacks the aesthetic appeal which is very impotrant in selling motor vehicles.

The present invention provides a chamber mounted on an exhaust pipe to rapidly heat air which is drawn through the chamber by a blower which is individually driven and controlled by an electric motor which can be varied in speed to provide the desired volume or amount of air on the windshield. The present invention further provides a series of slot-like openings in the cowling adjacent to the windshield and mounts a nozzle beneath these openings so that it is not visible from the exterior of the car.

Accordingly, it is an object of the present invention to provide a new and novel defroster and winshield heater.

Another object of the present invention is to provide a defroster and windshield heater which utilizes the heat of the exhaust gases to heat the air and has a blower for forcing the air onto the windshield.

Yet another object of the present invention is a defroster and windshield heater utilizing the heat from the exhaust gases to heat air and has a blower to force the air against the windshield, the control of the blower being independent of the operation of the engine of the motor vehicle.

Many other advantages, features and additional objects of the present invention will become manifest to those versed in the art upon making reference to the detailed description and the accompanying sheets of drawings, in which a preferred structural embodiment incorporating the principles of the present invention is shown by way of illustrative example.

BRIEF DESCRIPTION OF THE DRAWINGS

FIGURE 1 is a partial top plan view, having portions removed for purposes of illustration, illustrating the heating system mounted in a motor vehicle;

FIGURE 2 is a front end view of the motor vehicle heating system having portions removed and some portions in section for purposes of illustration;

FIGURE 3 is a partial side view of the vehicle and heating system having some portions removed and some portions in section for purposes of illustration; and FIGURE 4 is an enlarged cross-section of the damper valve illustrated in FIGURE 3.

DESCRIPTION OF THE PREFERRED EMBODIMENTS

The principles of this invention are particularly useful when embodied in a motor vehicle as illustrated in FIGURES 1 and 3 and generally indicated at 10.

The motor vehicle 10 has an engine compartment 11 which is separated from a driver's compartment 12 by a fire wall 13. The engine compartment 11 contains an internal combustion engine generally idicated at 14 which has a fan 15 attached thereto and an exhaust manifold 16 extending from a side of the engine 14 and connected to an exhaust pipe 17 which extends downwardly under the driver's compartment 12 and leads to a muffler not illustrated. The driver's compartment 12, as shown in FIGURE 3, has a dashboard 18 and a cowling 19 extending from the fire wall 13 toward the dashboard 18. The cowling 19 terminates at an edge 21 which engages and is sealed to a windshield 22.

The above described parts of the motor vehicle do not form a part of the present invention except for certain modifications which are described hereinbelow.

The defroster and windshield heater of this invention consist of a jacket 23, conduit means 24 having a blower assembly generally indicated at 25, nozzles 26 and a plurality of openings 27 in the cowling 19.

The jacket 23 is made-up of two sections, 28 and 29, which are placed about a portion of the exhaust pipe 17 to form a chamber 31. The portions 28 and 29 may be joined together by any conventional means, such as bolts, or may be held together by a strap means surrounding the two portions and clamping them on the exhaust pipe 17. The portion 28 has an outlet means 32 and a series of inlet means 33 which comprises louvered openings that are formed in the forward end of the member 29. Air entering the inlet means 33 passes around the exhaust pipe 17 to be heated. Then the heated air is removed from the chamber 31 through the outlet means 32. The jacket portions 28 and 29 are preferably made of steel having a corrosion protective coating or can be made of stainless steel.

The conduit means 24 conducts the air heated in the chamber 31 from the outlet means 32 to the blower assembly 25 and from the blower assembly 25 to the nozzle 26. A flexible tubing 34 of the conduit means 24 interconnects the outlet means 32 with an inlet means 35 of a blower housing 36 and an additional tubing 37 connects an outlet means 38 of the blower housing 36 with the nozzle 26. The tubing 34 is flexible to compensate for vibrations from the exhaust pipe 17 which are transmitted to the jacket 23. The tubing 37 may be either rigid or flexible.

The blower housing 36 has disposed therein a centrifugal fan 38 mounted on a shaft 39 of a two-speed blower motor 41. The housing 36 and the blower motor 41 are secured by any suitable means to the fire wall 13. It is noted that in order to save space in the engine compartment it may be desirable to turn the housing 36 and the motor 41, 90° from the position illustrated so that the shaft 39 will be parallel to the fire wall 13. The motor 41 has a control means 42 on the dashboard 18 which consists of a switch having multi-positions including a high-speed, low-speed and off position.

The nozzle 26 is connected to the conduit means 24 by an elbow-shaped member 44 extending between the tubing 37 and the nozzle. As shown in FIG. 1, the nozzle 26 is positioned to heat and defrost only one side of the windshield 22. An additional nozzle 45 is positioned adjacent to the nozzle 26 to heat the other side of the windshield. The nozzle 45 is connected to the conduit means 26 by a length of tubing 46 which extends from the nozzle 45 to a branch 47 on the elbow member 44. To insure an equal distribution of the warmed or hot air to both the nozzle 26 and the nozzle 45, a means 48 consisting of a constriction between the elbow 44 and the nozzle 26 is placed in the conduit system. This constriction 48 causes a back pressure which insures that an equal amount of the hot air will be forced to the additional nozzle 45.

The nozzles 26 and 45 are disposed in cavities 49, 49 formed beneath the opening or slots 27 and 51 in the cowling 19 with the delivering ends of each nozzle adjacent its respective openings. Both of the cavities 49 are designed to have a low portion 52 for trapping of any moisture which may enter the cavities through the openings 27 and 51. The nozzles 26 and 45 are oriented so as to discharge the hot air into the cavities 49, 49 adjacent to the openings 27 and 51 respectively so that the air is directed towards an exterior or outer surface 53 of the windshield 22. The discharging of the hot air onto the surface 53 of the windshield will heat the windshield 22 to cause defrosting and de-icing.

By controlling the speed of the electric motor 41 the operator of the motor vehicle 10 has an independent control of the amount of hot air which will be drawn through the chamber 31 by the centrifugal fan 39 and forced through the nozzles onto the windshield.

A damper 54 is disposed in the outlet means 32 of the jacket 23 to give additional control of the volume of hot air being drawn through the system by the blower 39. The damper 54 has a control arm 55 which is connected to a control cable 56 which extends through the fire wall 13 and terminates at a damper control unit 57 mounted on the dashboard 18 in the driving compartment 12.

The damper control unit 57 may consist of a knob which moves in and out with respect to the dashboard 18 to actuate the control cable 56 to open or close the damper 54 or the control unit 57 may consist of a lever which performs a similar function. The damper 54 can be adjusted from a position which completely closes the outlet 32 to a position which completely opens the outlet, or to any position therebetween. The adjustment of the damper 54, and the selection of the speeds of the electric motor 41 allows the operator of the motor vehicle to have a wide selection in the amount of air passing through the heating system. This selection is independent of the speed of the motor vehicle or the engine.

As may be seen from the figures the heating system of the present invention is completely disposed outside of the driver's compartment; therefore, if a leak occurs in the exhaust manifold 16 or the exhaust pipe 17, the harmful and obnoxious combustion gases will not be drawn into the driver's compartment but are merely passed outside of this compartment. By mounting the heating jacket 23 on the exhaust pipe 17 instead of on the exhaust manifold 16, it does not interfere with most routine repairs to the engine 14. However, the exhaust pipe 17 will heat up as fast as the exhaust manifold 16.

The heating system of the present invention is not intended to replace the hot water heating system which is usually provided on most motor vehicles but to be used in addition thereto, to allow rapid defrosting and de-icing of the windshield before the hot water heating system becomes effective. The heating system of this invention would also be effective as an additional means of defrosting the windshield during operation of the car in extremely cold weather when the capacity of the hot water system would be insufficient for both defrosting the windshield and heating the interior of the vehicle. The heating system of the present invention would also prevent the accumulation of freezing rain or snow on the blades of the windshield wiper by heating the blades with the flow of hot air used to defrost the windshield.

Although various minor modifications might be suggested by those versed in the art, it should be understood that I wish to employ within the scope of the present patent warranted hereon all such embodiments as reasonably and properly come within the scope of my contribution to the art.

I claim:

1. A heater for defrosting and de-icing a windshield of a motor vehicle, said heater comprising in combination:
    (a) a jacket adapted to surround a portion of an exhaust pipe which interconnects an exhaust manifold of the internal combustion engine of said vehicle and a muffler and to form a chamber about said portion, said jacket having an inlet means and an outlet means so that air admitted to said chamber will be heated by said portion;
    (b) a series of openings in the cowling of said vehicle adjacent an exterior surface of said windshield;
    (c) a nozzle mounted beneath said cowling with a delivery end adjacent said opening, said nozzle being orented to direct the flow of hot air through said openings onto said exterior surface of said windshield;
    (d) a conduit means extending between said nozzle and said outlet means of said jacket, said conduit means inclding a flexible portion; and
    (e) a blower and blower motor disposed in said conduit means, said blower motor having control means extending into the driver's compartment of said motor vehicle to allow control therefrom, said blower adapted to draw air into and through said chamber to be heated and through said conduit to be forced from said nozzle to defrost and de-ice said windshield.

2. A heater according to claim 1, which further includes a damper means disposed in said conduit means to regulate the flow of air through said conduit means, said damper means having a control means extending into said driver's compartment to allow said damper means to be adjusted therefrom.

3. A heater according to claim 1, in which said blower motor has a plurality of operating speeds and said control means includes a means for selecting one of said operating speeds of said motor.

4. A heater according to claim 1, which includes an additional nozzle mounted adjacent to said first mentioned nozzle, said conduit means including means to deliver air to said additional nozzle and a means to maintain an equal air flow through both nozzles.

References Cited

UNITED STATES PATENTS

| | | | |
|---|---|---|---|
| 1,586,688 | 6/1926 | Morgan | 98—2 |
| 1,774,448 | 8/1930 | McKnight | 98—2.4 |
| 1,842,251 | 1/1932 | Dickerson | 98—2.6 |
| 1,932,798 | 10/1933 | Millard | 98—2 |
| 2,016,019 | 10/1935 | Muvrin | 98—2.6 |

MEYER PERLIN, *Primary Examiner.*